Feb. 22, 1927.
W. L. BALDWIN
AUTOMOBILE SIGNAL
Filed Dec. 1, 1922
1,618,907
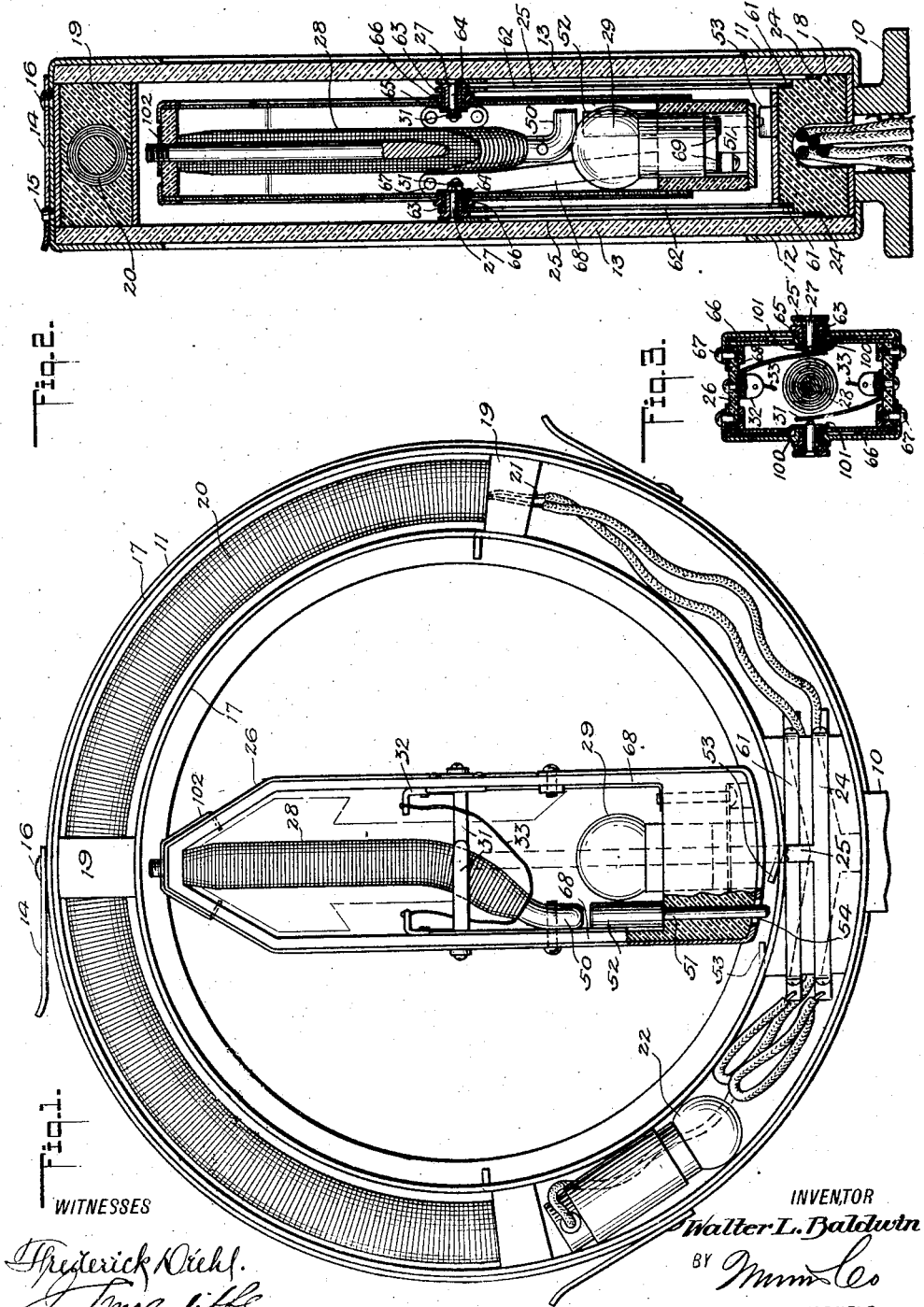
INVENTOR
Walter L. Baldwin
BY
ATTORNEYS
WITNESSES Patented Feb. 22, 1927.

1,618,907

UNITED STATES PATENT OFFICE.

WALTER LEO BALDWIN, OF SYRACUSE, NEW YORK.

AUTOMOBILE SIGNAL.

Application filed December 1, 1922. Serial No. 604,443.

My invention relates to automobile signals and particularly relates to the signal forming the subject matter of my United States application filed August 2, 1922, Serial Number 579,239, Patent Number 1,511,100. The former signal and the present one involves a pointer electromagnetically controlled and the general object of the present invention is to provide automatic stop means normally tending to hold the pointer against turning movement but said stop being adapted to be released by an electromagnetic responsive device.

The nature of the invention and its distinguishing features and advantages will more clearly appear as the description proceeds.

Reference is to be had to the accompanying drawings forming a part of this specification, it being understood that the drawings are merely illustrative of one example of the invention.

Figure 1 is an enlarged front view of the signal with the casing parts removed to show the interior construction and arrangement, a portion of the pointer being in section;

Figure 2 is a central transverse vertical section;

Figure 3 is a transverse section through the pointer at the pivots thereof.

The signal assemblage of aforenamed application includes a base 10 adapted to be suitably fastened by screws or the like to the top of a fender. A sectional enclosing case is provided formed in practice in half sections 11, 12 and having glass or equivalent transparent front and back 13 so that the signal is visible as viewed from the front or the rear. The casing sections 11, 12 are secured in the illustrated example by spring plate fasteners 14 on one section adapted to engage studs 15 on the other casing section, said fasteners 14 being pivotally mounted as by rivets 16 so as to swing transverse to the plane of the casing for fastening the sections or to fold in the plane of one section, 11, when the sections are unfastened and removed.

On the base 10 within the casing 11, 12 is a frame composed of inner and outer flat rings 17 spaced at the bottom by an insulating block 18 rigid with the base 10 and spaced at the sides and top by insulating blocks 19.

An electromagnet 20 is provided of arcuate form in the present instance to conform to the casing 11, 12 and to the frame rings 17 and be received between said rings.

The terminals 21 of the magnet connect with conductor wires leading through the block 18 and base. Between the frame rings or sections is provided a stop signal lamp 22. Transverse side bars 24 are provided on the block 18 from which rise standards 25 on the upper end of which standards is pivotally mounted a pointer designated generally by the numeral 26. Said pointer turns on pivot pins 27 disposed laterally inward toward each other at the upper ends of the standards 25. The pointer 26 is equipped with an electromagnet 28, and with an electric lamp 29 to illuminate the pointer. The front and back of the pointer 26 is transparent, the transparent portion being given the form of an arrow or other suitable shape for indicating a turning to the right or left according to the direction in which the pointer 26 is swung under the influence of the coils 20, 28.

The above mentioned elements are part of the signal disclosed in my aforenamed patent and as fully explained in said patent the magnets 20, 28 and the lamps 22, 29 are in an electric circuit which is controllable so that the current in magnet 20 is always unidirectional while the polarity of the pointer magnet 28 is reversed for the movement of the pointer to the right or to the left. The parts referred to need no further description in view of the disclosure in my previous application referred to.

In accordance with the present invention the core of the magnet 28 has the terminal 50 advantageously deflected laterally to lie adjacent to a side of the pointer to prevent interference with the lamp 29, and I provide a stop means controllable by said magnet 28 and its core terminal 50 for which purpose a pin 51 is disposed for axial movement in the pointer 26 adjacent the end having the lamp 29. The pin 51 has a head 52 under the influence of the terminal 50 when the magnet 28 is energized. The point of the pin extends through a hole 54 in the end of the pointer 26 and is adapted to gravitationally assume a position projected beyond said hole 54 sufficiently to dispose the pin between spaced stop members 53 whenever the pointer is in the neutral position. In practice when the circuit is closed to energize the pointer magnet 28 it will attract the pin 52 and withdraw the end of the pin from the path of the stops 53, so that the pointer may now oscillate freely under the action of the magnets 20, 28. On the other hand when the magnet 28 is de-energized and the pointer 26 gravitationally turns to the neutral position, the pin 51 will gravitate to the projected position for engagement by the stops 53 and thus accidental vibration of the pointer 26 from the neutral position is prevented.

As fully shown and described in my aforenamed application the circuit to the lamp 29 may be made as follows: In addition to the cross bars 24 on the block 18 cross bars 61 are provided on said block at opposite sides. Rising from the cross bars 61 are standards 62 disposed at the inner sides of the standards 25 and terminating in eyes 63 concentric with the pins 27 and insulated therefrom by a bushing 64. The eyes 63 extend into eyes 65 on cross bars 66 on opposite sides of the pointer 26. Screws 67 pass through the laterally bent ends of the cross bars 66 to the interior of the pointer 26 and engage in conductor strips 68 disposed on said pointer at the interior at opposite sides of the lamp 29 in planes at right angles to the standards 62. Said conductor strips 68 are connected with the lamp terminals 69. In order to insure electrical connection between the bars 66 with their eyes 65 and the bars 62 with their eyes 63 I suitably fasten to said bars 66 springs 100 formed with eyes 101 concentric with and spaced from the pins 27, said eyes contacting with the eyes 63.

In order to give the coil 20 a larger field to exert a stronger pull on the pointer 26 I provide on said pointer a strip 102 which is passed onto the projecting end of the core of magnet 28.

I would state in conclusion that while the illustrated example constitutes a practical embodiment of my invention, I do not limit myself strictly to the exact details herein illustrated, since, manfestly, the same can be considerably varied without departure from the spirit of the invention as defined in the appended claim.

Having thus described my invention, I claim:—

A signal of the class described including a frame, a pointer mounted to oscillate in said frame, a magnet carried by the pointer in approximately the medial plane thereof and formed with a terminal offset laterally and secured to the inside of the pointer, a pin mounted in the pointer and movable longitudinally, said pin being in alinement with said offset end, and spaced stop members on said frame to engage the pin, said pin and said members normally serving to prevent vibration of the pointer when in the neutral or non-signalling position, said magnet serving when energized to withdraw said pin from a position to engage said members on the frame, the offset terminal being so positioned to prevent interference with the lamp and its bulb.

WALTER LEO BALDWIN.